United States Patent
Morino et al.

(10) Patent No.: US 12,435,178 B2
(45) Date of Patent: Oct. 7, 2025

(54) RESIN COMPOSITION FOR FIBER-REINFORCED PLASTIC, AND FIBERREINFORCED PLASTIC CONTAINING SAID COMPOSITION

(71) Applicant: ADEKA CORPORATION, Tokyo (JP)

(72) Inventors: Kazuhide Morino, Kuki (JP); Naohiro Fujita, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 17/429,501

(22) PCT Filed: Mar. 4, 2020

(86) PCT No.: PCT/JP2020/009066
§ 371 (c)(1),
(2) Date: Aug. 9, 2021

(87) PCT Pub. No.: WO2020/184324
PCT Pub. Date: Sep. 17, 2020

(65) Prior Publication Data
US 2022/0144999 A1 May 12, 2022

(30) Foreign Application Priority Data
Mar. 8, 2019 (JP) .................. 2019-042809

(51) Int. Cl.
C08G 59/22 (2006.01)
C08G 59/24 (2006.01)
C08G 59/42 (2006.01)
C08G 59/68 (2006.01)
C08J 5/24 (2006.01)
C08K 5/5435 (2006.01)

(52) U.S. Cl.
CPC ......... *C08G 59/226* (2013.01); *C08G 59/245* (2013.01); *C08G 59/4238* (2013.01); *C08G 59/683* (2013.01); *C08G 59/688* (2013.01); *C08J 5/243* (2021.05); *C08J 5/249* (2021.05); *C08K 5/5435* (2013.01); *C08J 2363/02* (2013.01)

(58) Field of Classification Search
None
See application file for complete search history.

(56) References Cited

U.S. PATENT DOCUMENTS

| | | | | |
|---|---|---|---|---|
| 4,560,716 A * | 12/1985 | Sato | .......... | C09D 5/08 523/451 |
| 2009/0030158 A1* | 1/2009 | Amano | .......... | C07F 9/5407 548/335.1 |
| 2009/0131556 A1* | 5/2009 | Honda | .......... | C08G 59/42 264/328.8 |
| 2013/0178559 A1* | 7/2013 | Nakai | .......... | D06M 13/11 523/427 |
| 2015/0232620 A1 | 8/2015 | Sakane | | |
| 2016/0340469 A1 | 11/2016 | Endo et al. | | |
| 2018/0251612 A1* | 9/2018 | Fujita | .......... | C08G 59/40 |
| 2019/0023833 A1* | 1/2019 | Nagashimada | ...... | C09D 163/00 |
| 2019/0062491 A1 | 2/2019 | Endo et al. | | |
| 2020/0299458 A1* | 9/2020 | Kameyama | ........ | C08G 65/2603 |

FOREIGN PATENT DOCUMENTS

| | | |
|---|---|---|
| CN | 103304774 A | 9/2013 |
| CN | 104119640 A | 10/2014 |
| CN | 104718233 A | 6/2015 |
| CN | 105829387 A | 8/2016 |
| EP | 2 669 309 A1 | 12/2013 |
| JP | 8-156115 | 6/1996 |
| JP | 2008-38082 | 2/2008 |
| JP | 2013-209525 A | 10/2013 |
| JP | 2014-94937 | 5/2014 |
| JP | 2015-3938 | 1/2015 |
| JP | 2016-84373 A | 5/2016 |
| JP | 2017-119813 | 7/2017 |
| JP | 2017-519079 | 7/2017 |
| JP | 2018-95765 | 6/2018 |
| WO | 2007/125759 | 11/2007 |
| WO | 2009/014270 | 1/2009 |
| WO | 2016/088832 | 6/2016 |
| WO | 2017/038603 | 3/2017 |
| WO | 2017/082356 | 5/2017 |
| WO | WO-2017126568 A1 * | 7/2017 ............. C08G 59/24 |
| WO | 2018/035007 | 2/2018 |

OTHER PUBLICATIONS

International Search Report for PCT/JP2020/009066 dated May 26, 2020, 7 pages.
Written Opinion of the ISA for PCT/JP2020/009066 dated May 26, 2020, 5 pages.

* cited by examiner

*Primary Examiner* — Megan Mcculley
(74) *Attorney, Agent, or Firm* — NIXON & VANDERHYE

(57) ABSTRACT

A resin composition for fiber-reinforced plastic having a good balance between stability and curability and capable of producing fiber-reinforced plastic with improved strength. The composition contains an epoxy resin, an acid anhydride, and a catalyst that is liquid at 25° C. The catalyst is at least one member selected from the group consisting of a compound composed of an acid and a base and a compound composed of a quaternary onium cation and an anion.

9 Claims, No Drawings

RESIN COMPOSITION FOR FIBER-REINFORCED PLASTIC, AND FIBERREINFORCED PLASTIC CONTAINING SAID COMPOSITION

This application is the U.S. national phase of International Application No. PCT/JP2020/009066 filed Mar. 4, 2020 which designated the U.S. and claims priority to JP Patent Application No. 2019-042809 filed Mar. 8, 2019, the entire contents of each of which are hereby incorporated by reference.

TECHNICAL FIELD

This invention relates to a resin composition for fiber-reinforced plastic, a cured product thereof, and a fiber-reinforced plastic containing the resin composition.

BACKGROUND ART

It is well known that a thermosetting epoxy, unsaturated polyester, polyamide, or phenol resin is combined as a reinforcing material with a fiber material, such as carbon fiber and glass fiber, to produce moldings. Fiber-reinforced plastics (FRPs) produced by this technique are broadly used in structures, such as aircrafts, boats, and ships, and sports equipment, such as tennis rackets and golf clubs. Epoxy resins are often used as a well-balanced reinforcing material of FRP for their low cost and yet excellent performance in adhesion, heat resistance, and chemical resistance.

Patent literatures 1 to 3 listed below disclose epoxy resin compositions for FRP comprising an epoxy resin, an acid anhydride, and a curing catalyst. However, there has been the problem with these techniques that the use of the compounds proposed as a curing catalyst fails to provide a composition for FRP having a good balance between stability and curing properties.

CITATION LIST

Patent Literature

Patent literature 1: JP 2015-3938A
Patent literature 2: JP 8-156115A
Patent literature 3: JP 2008-38082A

SUMMARY OF INVENTION

Technical Problem

An object of the invention is to provide a resin composition for FRP having good impregnation owing to its low viscosity and a reduced increase in viscosity, well-balanced between stability and curability, and capable of producing FRP having good strength.

Solution to Problem

In order to accomplish the above object, the inventors have conducted intensive investigations. They have found, as a result, that a combination of an epoxy resin, an acid anhydride, and a specific catalyst that is liquid at 25° C. provides a resin composition for FRP excellent in stability and curability. The present invention has thus been completed.

The invention provides a resin composition for FRP (hereinafter simply referred to as the resin composition). The resin composition contains (A) an epoxy resin, (B) an acid anhydride, and (C) a catalyst that is liquid at 25° C. The catalyst (C), which is liquid at 25° C., is at least one member selected from the group consisting of (c1) a compound composed of an acid and a base and (c2) a compound composed of a quaternary onium cation and an anion.

The epoxy resin (A) of the resin composition of the invention preferably contains a polyglycidyl ether of a bisphenol-alkylene oxide adduct.

The polyglycidyl ether of a bisphenol-alkylene oxide adduct is preferably present in an amount of 10 to 80 mass %, relative to the epoxy resin (A).

The epoxy resin (A) of the resin composition of the invention preferably contains a dicyclopentadiene epoxy resin represented by formula (1):

[Chem. 1]

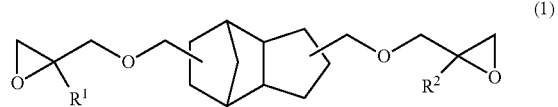

where $R^1$ and $R^2$ each independently represent hydrogen or methyl.

The dicyclopentadiene epoxy resin of formula (1) is preferably present in an amount of 0.1 to 30 mass % relative to the epoxy resin (A).

The acid anhydride (B) of the resin composition of the invention is preferably liquid at 25° C.

The acid anhydride (B) of the resin composition of the invention is preferably an unsaturated alicyclic polycarboxylic anhydride.

The catalyst (C) of the resin composition of the invention is preferably the compound (c1), which is composed of an acid and a base, wherein the compound (c1) is preferably a compound derived from an aromatic compound and an organic basic compound.

The compound (c1) of the resin composition of the invention is preferably a compound derived from a monocyclic aromatic compound and a nitrogen-containing heterocyclic compound.

The catalyst (C) of the resin composition of the invention is preferably the compound (c2) which is composed of a quaternary onium cation and an organic anion, wherein the quaternary onium cation is preferably a phosphonium cation.

The organic anion of the compound (c2) of the resin composition of the invention is preferably an alkylphosphorodithioate.

The resin composition of the invention preferably contains 0.01 to 20 parts by mass of the catalyst (C) per 100 parts by mass of the epoxy resin (A).

The resin composition of the invention preferably further contains (D) a silane coupling agent.

The invention also provides a cured product obtained by curing the resin composition of the invention.

The invention also provides an FRP obtained by curing a composition composed of the resin composition of the invention and reinforcing fibers.

Advantageous Effect of Invention

The resin composition according to the invention has good impregnation properties due to its low viscosity and a reduced increase in viscosity and is excellent in stability and curability. Therefore, application of the resin composition of the invention to fibers provides highly strong FRP with ease.

Embodiment of Invention

The resin composition for FRP of the invention will be described first. The resin composition of the invention contains (A) an epoxy resin.

Examples of the epoxy resin as component (A) include polyglycidyl ethers of mononuclear polyhydric phenol compounds, such as hydroquinone, resorcin, pyrocatechol, and phloroglucinol; polyglycidyl ethers of polynuclear polyhydric phenol compounds, such as dihydroxynaphthalene, biphenol, methylenebisphenol (bisphenol F), methylenebis (o-cresol), ethylidenebisphenol, isopropylidenebisphenol (bisphenol A), isopropylidenebis(o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolak, o-cresol novolak, ethylphenol novolak, butylphenol novolak, octylphenol novolak, resorcin novolak, and terpene phenol; polyglycidyl ethers of polyhydric alcohol compounds, such as ethylene glycol, propylene glycol, butylene glycol, hexanediol, neopentyl glycol, polyethylene glycol, polypropylene glycol, thioglycol, dicyclopentadienedimethanol, 2,2-bis(4-hydroxycyclohexyl)propane (hydrogenated bisphenol A), glycerol, trimethylolpropane, pentaerythritol, sorbitol, and a bisphenol-alkylene oxide adduct; homo- or copolymers of glycidyl methacrylate or glycidyl esters of aliphatic, aromatic, or alicyclic polybasic acids, such as maleic acid, fumaric acid, itaconic acid, succinic acid, glutaric acid, suberic acid, adipic acid, azelaic acid, sebacic acid, dimeric acid, trimeric acid, phthalic acid, isophthalic acid, terephthalic acid, trimellitic acid, trimesic acid, pyromellitic acid, tetrahydrophthalic acid, and endomethylenetetrahydrophthalic acid; epoxy compounds having a glycidylamino group, such as N,N-diglycidylaniline, bis(4-(N-methyl-N-glycidylamino)phenyl)methane, diglycidyl o-toluidine, N,N-bis(2,3-epoxypropyl)-4-(2,3-epoxypropoxy)-2-methylaniline, N,N-bis(2,3-epoxypropyl)-4-(2,3-epoxypropoxy) aniline, and N,N,N',N'-tetra(2,3-epoxypropyl)-4,4-diaminodiphenylmethane; epoxides of cyclic olefin compounds, such as vinylcyclohexene diepoxide, cyclopentadiene diepoxide, 3,4-epoxycyclohexylmethyl-3',4'-epoxycyclohexane carboxylate, 3,4-epoxy-6-methylcyclohexylmethyl-6-methylcyclohexane carboxylate, and bis(3,4-epoxy-6-methylcyclohexylmethyl) adipate; epoxidized conjugated diene polymers, such as epoxidized polybutadiene and an epoxidized styrene-butadiene copolymer; and heterocyclic compounds, such as triglycidyl isocyanurate. These epoxy resins may be internally crosslinked by an isocyanate-terminated prepolymer or increased in molecular weight by a polyactive hydrogen compound (e.g., polyhydric phenols, polyamines, carbonyl-containing compounds, and polyphosphoric esters). The epoxy resins may be used either individually or in combination of two or more thereof. It is preferred to use the epoxy resin which is liquid at 25° C. in view of impregnation into a fiber material.

The epoxy resin (A) preferably contains a polyglycidyl ether of a bisphenol-alkylene oxide adduct with a view to improving elongation at break of a cured product so that the cured product may conform to the elongation of fibers.

The polyglycidyl ether of a bisphenol-alkylene oxide adduct may be prepared as follows. A bisphenol-alkylene oxide adduct is obtained by the addition of an alkylene oxide to a compound having two phenolic hydroxyl groups (i.e., hydroxyl groups directly bonded to an aromatic ring), such as bisphenol A, bisphenol F, or biphenol. At least 2 equivalents of the alkylene oxide are used per equivalent of the phenolic hydroxyl groups. If necessary, a catalyst may be used in the addition reaction. The resulting alkylene oxide adduct is caused to react with epichlorohydrin to form a polyglycidyl ether of the bisphenol-alkylene oxide adduct. Where needed, a catalyst and/or a solvent may be used in the reaction with epichlorohydrin. The process for preparing a polyglycidyl ether of a bisphenol-alkylene oxide adduct is not specifically limited, and any known processes may be used. The reaction conditions are not limited, and any known conditions are usable.

Examples of the alkylene oxide include ethylene oxide, 1,2-propylene oxide, 1,2-butylene oxide, and 1,2-pentylene oxide.

The catalyst that is optionally used in the addition of the alkylene oxide includes an acid catalyst or an alkali catalyst. Examples of the acid catalyst include Broensted acids, such as sulfuric acid and phosphoric acid, and Lewis's acids, such as stannic chloride and boron trifluoride. Examples of the alkali catalyst include tertiary amines; hydroxides of alkali metals, alkaline earth metals, or quaternary ammonium, such as sodium hydroxide, potassium hydroxide, ammonium hydroxide, calcium hydroxide, and barium hydroxide; and alkali metal carbonates, such as potassium carbonate and sodium carbonate. The alkali catalysts are preferred in terms of ease of the purification process after the reaction. The alkali metal or alkaline earth metal hydroxides are more preferred. The alkali metal hydroxides are even more preferred. These catalysts may be used either individually or in combination thereof.

Examples of the catalyst that can be optionally used in the reaction of epichlorohydrin include the catalysts recited above for the addition of the alkylene oxide and, in addition, phase transfer catalysts, such as tetrabutylammonium salts, trioctylmethylammonium salts, and benzyldimethyloctadecylammonium salts. Preferred of them are the alkali catalysts in terms of the ease of purification after completion of the reaction. The alkali metal or alkaline earth metal hydroxides are more preferred, with the alkali metal hydroxide being even more preferred. These catalysts may be used either individually or in combination thereof.

Examples of the solvent that can be used if necessary in the epichlorohydrin reaction include ketones, such as acetone and methyl ethyl ketone; alcohols, such as methanol, ethanol, 1-propyl alcohol, isopropyl alcohol, 1-butanol, sec-butanol, and tert-butanol; glycol ethers such as Methyl Cellosolve and Ethyl Cellosolve; ethers, such as tetrahydrofuran, 1,4-dioxane, 1,3-dioxane, and diethoxyethane; and aprotic polar solvents, such as acetonitrile, dimethyl sulfoxide, and dimethylformamide. These organic solvents may be used either individually or in combination thereof.

In the reaction between the alkylene oxide adduct and epichlorohydrin, the epichlorohydrin is used in an amount of 1 to 10 equiv. per equiv. of the hydroxy groups of the alkylene oxide adduct. After completion of the reaction, excess epichlorohydrin is removed by evaporation to yield a more preferred polyglycidyl ether of the bisphenol-alkylene oxide adduct.

The ratio of the polyglycidyl ether of bisphenol-alkylene oxide adduct in the epoxy resin (A) is not critical, but is preferably 10 to 80 mass %, more preferably 20 to 60 mass %. With the ratio being in that range, the elongation displacement increases, the toughness of a cured product improves, and the heat resistance (Tg) rises.

With a view to obtaining excellent wetting quality to fibers, the epoxy resin (A) preferably contains a dicyclopentadiene epoxy resin represented by formula (1):

[Chem. 2]

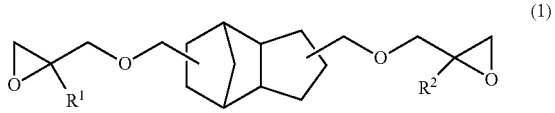

(1)

where $R^1$ and $R^2$ each independently represent a hydrogen atom or a methyl group.

The ratio of the dicyclopentadiene epoxy resin of formula (1) in the epoxy resin (A) is not critical, but is preferably 0.1 to 30 mass %, more preferably 3 to 15 mass %. When present in a ratio in the above range, the dicyclopentadiene epoxy resin exhibits enhanced effect in improving the adhesion, and the heat resistance (Tg) further increases.

It is preferred for the epoxy resin (A) to contain both the bisphenol-alkylene oxide adduct polyglycidyl ether and the dicyclopentadiene epoxy resin of formula (1) with a view to obtaining good conformability to fibers in a cured product and excellent wetting quality.

The resin composition of the invention contains (B) an acid anhydride. Examples of the acid anhydride (B) include unsaturated aliphatic polycarboxylic anhydrides, saturated aliphatic polycarboxylic anhydrides, unsaturated alicyclic polycarboxylic anhydrides, saturated alicyclic polycarboxylic anhydrides, and aromatic polycarboxylic anhydrides.

The unsaturated aliphatic polycarboxylic anhydrides are preferably those having 4 to 20 carbon atoms, such as maleic anhydride.

The saturated aliphatic polycarboxylic anhydrides are preferably those having 4 to 20 carbon atoms, such as succinic anhydride.

The unsaturated alicyclic polycarboxylic anhydrides are preferably those having 3 to 7 carbon atoms in their ring structure, such as himic anhydride, methylhimic anhydride, tetrahydrophthalic anhydride, and methyltetrahydrophthalic anhydride.

The saturated alicyclic polycarboxylic anhydrides are preferably those having 3 to 7 carbon atoms in their ring structure, such as hexahydrophthalic anhydride, methylhexahydrophthalic anhydride, hydrogenated methylnadic anhydride, and a trialkyltetrahydophthalic anhydride-maleic anhydride adduct.

Examples of the aromatic polycarboxylic anhydrides include aromatic dicarboxylic anhydrides, such as phthalic anhydride, aromatic tricarboxylic anhydrides, such as trimellitic anhydride, and aromatic tetracarboxylic anhydrides, such as pyromellitic anhydride and benzophenonetetracarboxylic anhydride.

Preferred of these acid anhydrides are those which are liquid at 25° C. in terms of better miscibility with component (A) and better impregnation into fibers. Preferred examples of the acid anhydrides that are liquid at 25° C. include unsaturated alicyclic polycarboxylic anhydrides that are liquid at 25° C., such as methyltetrahydrophthalic anhydride; and saturated alicyclic polycarboxylic anhydrides that are liquid at 25° C., such as methylhexahydrophthalic anhydride, methylnadic anhydride, and hydrogenated methylnadic anhydride. The acid anhydride (B) preferably has a viscosity of 100 Pa·s or lower at 25° C. The viscosity of the acid anhydride can be measured using, e.g., a cone-plate viscometer. The acid anhydride recited above may be used either individually or in combination thereof.

The content of the acid anhydride (B) in the resin composition of the invention is not critical, but is preferably such that the number of the acid anhydride groups in the acid anhydride is 0.7 to 1.6, more preferably 0.9 to 1.2, per epoxy group in the epoxy resin. With the amount of the acid anhydride (B) being in that range, the resulting FRP will have improved heat resistance.

The resin composition of the invention contains (C) a catalyst that is liquid at 25° C. The catalyst (C), which is liquid at 25° C., is used to accelerate the reaction between the epoxy resin and the acid anhydride use as a curing agent. The catalyst (C) preferably has a viscosity of 100 Pa·s or lower at 25° C. The viscosity can be measured using, e.g., a cone-plate viscometer. The catalyst (C), which is liquid at 25° C., contains at least one member selected from the group consisting of (c1) a compound composed of an acid and a base and (c2) a compound composed of a quaternary onium cation and an anion. The catalyst (C) preferably contains either one of the compound (c1) and the compound (c2). More preferably, the catalyst (C) is composed solely of the compound (c1) or the compound (c2).

The compound (c1) is exemplified by a compound derived from an aromatic compound and an organic base or a compound derived from a fatty acid and an organic base. The aromatic compound is exemplified by monocyclic compounds, such as phenol and nonylphenol. Examples of the fatty acid include fatty acids having 1 to 30 carbon atoms, such as octylic acid, oleic acid, and acetic acid. The organic base is exemplified by nitrogen-containing heterocyclic compounds, such as cyclic amidines. Examples of the cyclic amidines include 1,8-diazabicyclo[5.4.0]undec-7-ene (DBU) and 1,5-diazabicyclo[4.3.0]non-5-ene (DBN). Examples of the compound derived from the cyclic amidine and the aromatic compound include 1,8-diazabicyclo[5.4.0]undec-7-ene (DBU) phenol salt. Examples of the compound derived from the cyclic amidine and the fatty acid include DBU octylate, DBU oleate, and DBN octylate. With a view to obtaining a resin composition having excellent stability and good curability, a compound derived from an aromatic compound, such as phenol, and an organic basic compound, such as a cyclic amidine, is preferred as compound (c1). The above-described compounds (c1) may be used either individually or in combination of two or more thereof.

Examples of the compound (c2) include phosphonium salts composed of a quaternary phosphonium cation and an organic anion and imidazolium salts composed of an imidazolium cation and an anion, such as an organic anion. The quaternary phosphonium cation is preferably a tetraalkylphosphonium cation. The imidazolium cation is preferably a dialkylimidazolium cation. Examples of the organic anion include alkylphosphorodithioates, such as diethylphosphorodithioate; alkyl phosphates, such as dimethyl phosphate; alkyl sulfates, such as alkyl sulfate and ethyl sulfate; and acetates.

Specific examples of the phosphonium salts as component (c2) include tetra-n-butylphosphonium O,O-diethylphosphorodithioate and tri-n-butylmethylphosphonium O,O'-dimethylphosphate.

Specific examples of the imidazolium salts as component (c2) include 1-butyl-3-methylimidazolium acetate, 1-butyl-3-methylimidazolium hydrogensulfate, 1-butyl-3-methylimidazolium methylsulfate, 1-ethyl-3-methylimidazolium ethylsulfate, 1-butyl-3-methylimidazolium tetrachloroammonium, 1-ethyl-3-methylimidazolium halogensulfate, 1-butyl-3-methylimidazolium tetrachloroaluminate, 1-ethyl- 3-methylimidazolium hydrogensulfate, 1-butyl-3-ethylimidazolium thiocyanate, 1-butyl-3-methylimidazolium thiocyanate, 1-ethyl-3-methylimidazolium methanesulfonate, 1-ethyl-3-methylimidazolium tetrachloroaluminate, 1-ethyl-3-methylimidazolium thiocyanate, 1-methylimidazolium hydrogensulfate, 1-ethyl-3-methylimidazolium tetrafluoroborate, 1-butyl-3-methylimidazolium tetrafluoroborate, 1-butyl-3-methylimidazolium hexafluoroantimonate, and 1-butyl-3-methylimidazolium hexafluorophosphate.

With a view to obtaining a resin composition having excellent stability and good curability, the compound (c2) is preferably selected from compounds composed of a quaternary phosphonium cation and an organic anion, more preferably phosphonium salts, with tetra-n-butylphosphonium O,O-diethylphosphorodithioate being particularly preferred. The above recited compounds (c2) may be used either individually or in combination thereof.

The content of the catalyst (C), which is liquid at 25° C., in the resin composition of the invention is not critical, but is preferably 0.01 to 20 parts, more preferably 0.1 to 10 parts, by mass per 100 parts by mass of the epoxy resin (A). With the content of the catalyst (C) being in that range, the resulting resin composition will exhibit sufficient curability and high storage stability.

The resin composition of the invention may further contain (D) a silane coupling agent in view of improvement on adhesion to fibers.

Examples of the silane coupling agent (D) include amino-functional silane coupling agents, glycidoxy-functional silane coupling agents, epoxy-functional silane coupling agents, vinyl-functional silane coupling agents, isocyanate-functional silane coupling agents, (meth)acryloyl-functional silane coupling agents, halogen-functional silane coupling agents, and mercaptan-functional silane coupling agents. The amino-functional silane coupling agents include γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, and N-β-(N-vinylbenzylaminoethyl)-γ-aminopropyltriethoxysilane. The glycidoxy-functional silane coupling agents include γ-glycidoxypropyltriethoxysilane. The epoxy-functional silane coupling agents include β-(3,4-epoxycyclohexyl)ethyltriethoxysilane. The vinyl-functional silane coupling agents include vinyltriethoxysilane. The isocyanate-functional silane coupling agents include γ-isocyanatopropyltriethoxysilane. The (meth)acryloyl-functional silane coupling agents include γ-methacryloylpropyltrimethoxysilane. The halogen-functional silane coupling agents include γ-chloropropyltrimethoxysilane. The mercapto-functional silane coupling agents include γ-mercaptopropyltrimethoxysilane. These silane coupling agents may be used either individually or in combination thereof.

Preferred silane coupling agents, in terms of availability and cost, are amino-functional or glycidoxy-functional silane coupling agents, with glycidoxy-functional silane coupling agents being more preferred. The amino-functional silane coupling agent is preferably γ-aminopropyltriethoxysilane. The glycidoxy-functional silane coupling agent is preferably γ-glycidoxypropyltriethoxysilane. Gamma-glycidoxypropyltriethoxysilane is preferable to γ-aminopropyltriethoxysilane.

The content of the silane coupling agent (D) in the resin composition of the invention is not critical, but is preferably 0.1 to 50 parts by mass per 100 parts by mass of the total weight of the compounds having an epoxy group. From the viewpoint of good miscibility with the resin and improved adhesion to fibers, the content of the silane coupling agent (D) is more preferably 1 to 20 parts by mass.

The resin composition of the invention may contain a reactive diluent to adjust the viscosity as desired. Examples of useful reactive diluents include n-butyl glycidyl ether, C12-C14 alkyl glycidyl ethers, allyl glycidyl ether, 2-ethylhexyl glycidyl ether, styrene oxide, phenyl glycidyl ether, cresyl glycidyl ether, p-sec-butylphenyl glycidyl ether, t-butylphenyl glycidyl ether, glycidyl methacrylate, and tertiary carboxylic acid glycidyl esters.

If necessary, the resin composition of the invention may further contain other additives. Common additives are usable, including non-reactive diluents (plasticizers), such as dioctyl phthalate, dibutyl phthalate, benzyl alcohol, and coal tar; pigments; lubricants, such as candelilla wax, carnauba wax, Japan tallow, Chinese insect wax, bees wax, lanolin, spermaceti, montan wax, petroleum wax, fatty acid waxes, fatty acid esters, fatty acid ethers, aromatic esters, and aromatic ethers; thickeners; thixotropic agents; antioxidants; light stabilizers; UV absorbers; flame retardants; anti-foaming agents; and rust inhibitors.

With a view to ensuring the stability of the resin composition of the invention, it is preferred for the resin composition to have a rate of viscosity increase of 200% or lower as measured by the method below.

Method for Measuring Rate of Viscosity Increase:

A 2000 g portion of the resin composition is put in a container, and its temperature is adjusted to 25° C. The viscosity V1 of the resin composition at 25° C. is measured. Thereafter, an acceleration test is performed on the resin composition, and the viscosity V2 of the resin composition at 25° C. after the acceleration test is measured. The rate of viscosity increase is calculated from V1 and V2 according to equation:

Rate of viscosity increase (%)=($V2/V1$)×100

The acceleration test is carried out by leaving the container containing the resin composition in a water bath kept at 25° C. for 4 hours. The viscosity measurement is taken using TVE-35H from Toki Sangyo Co., Ltd.

Seeing that the resin composition of the invention is used to manufacture FRP, it is preferably liquid at 25° C. It is more preferred for the resin composition to have a viscosity of 100 to 3000 mPa·s at 25° C.

The resin composition of the invention provides a cured product upon curing. The curing method and conditions are not particularly restricted, and any known curing methods and conditions may be employed.

The resin composition of the invention can be used to produce FRP. An FRP can be produced by, for example, curing a composition containing the resin composition of the invention and reinforcing fibers. The ratio of the resin composition of the invention to the reinforcing fibers is not critical, but it is preferred to use 5 to 150 parts, more preferably 15 to 70 parts, by mass of the resin composition of the invention per 100 parts by mass of the reinforcing fibers. The curing method and conditions are not particularly limited, and any known curing techniques and conditions can be used.

The reinforcing fibers are not particularly limited, including carbon fibers, glass fibers, aramid fibers, boron fibers, alumina fibers, and silicon carbide fibers. These fibers may be used either individually or in combination of two or more types thereof. Two or more different types of fibers may be used in the form of hybrid fibers.

The FRP systems include tow sheets in which high strength, high elastic modulus fibers are arranged unidirectionally, unidirectional or bidirectional fabrics in which the fibers are arranged unidirectionally or bidirectionally, triaxial fabrics in which the fibers are arranged tridirectionally, and multidirectional fabrics in which the fibers are oriented in multiple directions. In making tow sheets, it is recommended that the fibers be arranged with moderate spacing between strands so as to improve resin impregnation into the fiber substrate.

The FRP forming processes are not particularly limited and include extrusion molding, blow molding, compression molding, vacuum forming, injection molding, resin transfer molding (RTM), vacuum assisted RTM, laminate molding, hand layup, filament winding, and fiber-to-composite processing.

The FRP obtained by using the resin composition of the invention is useful in a variety of applications, including general industrial applications, such as structural parts of vehicles (including motorcars, boats, ships, and railroad cars), drive shafts, flat springs, wind turbine blades, pressure vessels, flywheels, papermaking rollers, roofing materials, cables, and repairing/reinforcing materials; aerospace applications, such as fuselages, wings, tails, flight control surfaces, fairings, cowls, doors, seats, interior materials, motor cases, and antennas; and sports equipment, such as golf club shafts, fishing rods, tennis rackets, badminton rackets, ice hockey sticks, and ski poles.

EXAMPLES

The invention will now be illustrated in greater detail with reference to Examples. The amounts of the components shown in Tables 1 and 2 are given in part by mass.

Example 1

The components shown in Table 1 were placed in a 500 mL disposable cup in the ratio shown (in part by mass) and stirred with a spatula at 25° C. for 5 minutes. The mixture was further stirred in a planetary stirrer to prepare a resin composition. The components listed in Table 1 are as follows.
Epoxy resins (Adeka Resin series from Adeka Corp.):
  EP-4901E (bisphenol F epoxy resin; epoxy equiv.: 170 g/eq)
  EP-4005 (polyglycidyl ether of bisphenol A-propylene oxide adduct; epoxy equiv.: 510 g/eq)
  EP-4088S (dicyclopentadiene epoxy resin of formula (1) in which $R^1$=$R^2$=H; epoxy equiv.: 170 g/eq)
Acid anhydride: HN-2000, from Hitachi Chemical Co., Ltd. (methyltetrahydrophthalic anhydride, liquid at 25° C.; viscosity (25° C.): 38 mPa·s)
Catalysts:
  Hishicolin PX-4ET, from Nippon Chemical Industrial Co., Ltd. (tetrabutylphosphonium O,O-diethylphosphorodithioate, liquid at 25° C.; viscosity (25° C.): 1000 mPa·s)
  U-CAT SA-1, from San-Apro Ltd. (DBU phenol salt, liquid at 25° C.; viscosity (25° C.): 320 mPa·s)
  Adeka Hardener, from Adeka Corp. (1,3,5-trisdimethylaminomethylphenol)
Silane coupling agent: KBM-403, from Shin-Etsu Chemical Co., Ltd. (γ-glycidoxypropyltriethoxysilane)

Example 2 and Comparative Examples 1 and 2

Resin compositions were prepared in the same manner as in Example 1, except for changing the mixing ratio of the components as shown in Table 1.

The ratio of the acid anhydride to the epoxy resin in every resin composition prepared in Examples 1 and 2 and Comparative Examples 1 and 2 was one acid anhydride group per one epoxy group.

The resin compositions prepared in Examples 1 and 2 and Comparative Examples 1 and 2 were evaluated as follows. The results obtained are shown in Table 1.
(1) Rate of Viscosity Increase The viscosity increase rate (%) of the resin compositions prepared in Examples 1 and 2 and Comparative Examples 1 and 2 was obtained by the method previously described. The viscosity of these resin compositions at 25° C. was measured by the method described above.
(2) Degree of Cure The resin compositions prepared in Examples 1 and 2 and Comparative Examples 1 and 2 were cured by heating at 100° C. for 1 hour. The degree of cure of the resulting samples was measured in accordance with JIS K7148-1.

TABLE 1

| Component | | Example 1 | Example 2 | Comparative Example 1 | Comparative Example 2 |
|---|---|---|---|---|---|
| Epoxy Resin | EP-4901E | 63 | 63 | 63 | 63 |
| | EP-4005 | 25 | 25 | 25 | 25 |
| | EP-4088S | 10 | 10 | 10 | |
| Acid Anhydride | HN-2000 | 81 | 81 | 81 | 81 |
| Catalyst | PX-4ET | 5 | | | |
| | SA-1 | | 5 | | |
| | EHC-30 | | | 5 | 1 |
| Silane Coupling Agent | KBM-403 | 2 | 2 | 2 | 2 |
| Viscosity Increase Rate (%) | | 135 | 163 | 510 | 151 |
| Viscosity (Pa · s) | | 500 | 500 | 1100 | 270 |
| Degree of Cure | | 98.0 | 93.0 | 97.0 | 79.0 |

As is apparent from Table 1, the resin compositions of Examples 1 and 2 have a small viscosity increase, proving excellent in stability. It is also clear that the resin compositions of Examples 1 and 2 are suitable as a resin matrix material for making FRP as is verified by the high degree of cure of the cured products obtained therefrom.

Examples 3 and 4

A carbon fiber-reinforced plastic (CFRP) for evaluation of physical properties was produced by filament winding and subjected to the testing described below. CFRP was formed by impregnating a roving with the resin composition kept at 25° C. in a resin bath, hoop-winding the impregnated roving onto a flat mandrel to a prescribed thickness of 3 to 4 mm, and curing the resin by press heating at 100° C. for 1 hour. The resin composition to carbon fiber ratio was 50:100 by mass.

The following evaluation was conducted using the resulting test specimens. The results are shown in Table 2.
Methods for Testing Physical Properties:

The bending strength (MPa) and interlaminar shear strength (MPa) of the cured product were determined in accordance with JIK K-7074 and K7078, respectively.

TABLE 2

| Component | | Example 3 | Example 4 |
|---|---|---|---|
| Epoxy Resin | EP-4901E | 63 | 63 |
| | EP-4005 | 25 | 25 |
| | EP-4088S | 10 | 10 |

TABLE 2-continued

| | | Example | |
| --- | --- | --- | --- |
| Component | | 3 | 4 |
| Acid Anhydride | HN-2000 | 81 | 81 |
| Catalyst | PX-4ET | 5 | |
| | SA-1 | | 5 |
| Silane Coupling Agent | KBM-403 | 2 | 2 |
| CFRP Physical Properties | Bending Strength | 1230 | 1250 |
| | Interlaminar Shear Strength | 62.0 | 65.0 |

As is apparent from Table 2, the CFRPs obtained in Examples 3 and 4 had sufficient bending strength and interlaminar shear strength for practical use.

The invention claimed is:

1. A composition comprising 100 parts by mass of reinforcing fibers and 5 to 150 parts by mass of a resin composition for fiber-reinforced plastic comprising (A) an epoxy resin, (B) an acid anhydride, and (C) a catalyst that is liquid at 25° C., the catalyst (C) comprising at least one member selected from the group consisting of (c1) a compound composed of an acid derived from an aromatic compound comprising phenol or nonylphenol and an organic base derived from a cyclic amidine comprising 1,8-diazabicyclo[5.4.0]undec-7-ene or 1,5-diazabicyclo[4.3.0]non-5-ene and (c2) a compound composed of a tetraalkylphosphonium cation and an anion selected from the group consisting of alkylphosphorodithioate, alkyl phosphate, and ethyl sulfate, wherein the resin composition contains 5.1 to 20 parts by mass of the catalyst (C) per 100 parts by mass of the epoxy resin (A), wherein the resin composition for fiber-reinforced plastic has a rate of viscosity increase of 200% or less, measured as follows:

a 2000 g portion of the resin composition is put in a container, and its temperature is adjusted to 25° C.; a first viscosity V1 of the resin composition at 25° C. is measured; then an acceleration test is performed on the resin composition, and a second viscosity V2 of the resin composition at 25° C. is measured after the acceleration test to calculate the rate of viscosity increase according to the equation:

rate of viscosity increase (%)=(V2/V1)×100:

wherein the acceleration test is carried out by leaving the container containing the resin composition in a water bath kept at 25° C. for 4 hours, wherein the acid anhydride (B) comprises an unsaturated alicyclic polycarboxylic acid anhydride which is liquid at 25° C., and the content of the acid anhydride (B) in the resin composition is such that the number of the acid anhydride groups in the acid anhydride is 0.9 to 1.2 per epoxy group in the epoxy resin, and wherein the epoxy resin (A) comprises a dicyclopentadiene epoxy resin represented by formula (1):

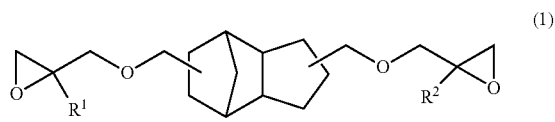

where $R^1$ and $R^2$ each independently represent a hydrogen atom or a methyl group.

2. The composition according to claim 1, wherein the epoxy resin (A) comprises a polyglycidyl ether of a bisphenol-alkylene oxide adduct.

3. The composition according to claim 2, wherein the polyglycidyl ether of a bisphenol-alkylene oxide adduct is present in an amount of 10 to 80 mass % relative to the epoxy resin (A).

4. The composition according to claim 1, wherein the dicyclopentadiene epoxy resin is present in an amount of 0.1 to 30 mass % relative to the epoxy resin (A).

5. The composition according to claim 1, wherein the catalyst (C) comprises the compound (c1).

6. The composition according to claim 1, wherein the anion is alkylphosphorodithioate.

7. The composition according to claim 1, further comprising (D) a silane coupling agent.

8. A fiber-reinforced plastic obtained by curing the composition according to claim 1.

9. A method for producing a fiber-reinforced plastic comprising providing the composition according to claim 1, and curing the composition.

* * * * *